(12) United States Patent
Fukumoto et al.

(10) Patent No.: US 12,111,224 B2
(45) Date of Patent: Oct. 8, 2024

(54) OPTICAL TRANSMISSION PATH INSPECTING SYSTEM, AND OPTICAL TRANSMISSION PATH INSPECTING DEVICE

(71) Applicants: SUMITOMO ELECTRIC OPTIFRONTIER CO., LTD., Yokohama (JP); SUMITOMO ELECTRIC INDUSTRIES, LTD., Osaka (JP)

(72) Inventors: Gouichi Fukumoto, Yokohama (JP); Yoshifumi Hishikawa, Yokohama (JP); Tetsufumi Tsuzaki, Yokohama (JP); Toshiyuki Miyamoto, Yokohama (JP); Kenichiro Otsuka, Osaka (JP)

(73) Assignees: SUMITOMO ELECTRIC OPTIFRONTIER CO., LTD., Yokohama (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 264 days.

(21) Appl. No.: 17/612,745

(22) PCT Filed: Jun. 3, 2020

(86) PCT No.: PCT/JP2020/021989
§ 371 (c)(1),
(2) Date: Nov. 19, 2021

(87) PCT Pub. No.: WO2020/250782
PCT Pub. Date: Dec. 17, 2020

(65) Prior Publication Data
US 2022/0236141 A1    Jul. 28, 2022

(30) Foreign Application Priority Data
Jun. 11, 2019   (JP) .................. 2019-108603

(51) Int. Cl.
*G01M 11/00*  (2006.01)
*H04B 10/077*  (2013.01)

(52) U.S. Cl.
CPC ....... *G01M 11/335* (2013.01); *H04B 10/0775* (2013.01)

(58) Field of Classification Search
CPC .... G01M 11/33; G01M 11/335; G01M 11/39; H04B 10/0731; H04B 10/0775
See application file for complete search history.

(56) References Cited

U.S. PATENT DOCUMENTS

2011/0116080 A1\*  5/2011  Uchiyama ............ G01M 11/335
                                                    356/73.1
2016/0164601 A1    6/2016  Perron
(Continued)

FOREIGN PATENT DOCUMENTS

EP         3032237 A2    6/2016
JP      H04-138332 A     5/1992
(Continued)

*Primary Examiner* — Hina F Ayub
(74) *Attorney, Agent, or Firm* — Oliff PLC

(57) ABSTRACT

An inspecting device has an optical switch selectively coupling a light source unit with each of light input/output ports; a first light detecting unit detecting a first intensity of test light input from an inspecting device on a counterpart side and passing through the optical switch; a second light detecting unit detecting a second intensity of the test light directed from the light source unit toward the optical switch; a third light detecting unit optically coupled to another end of a test optical fiber having one end connected to each of the plurality of light input/output ports, and detecting a third intensity of the test light received from the light source unit via the test optical fiber; and an internal loss recording unit recording a loss of an optical path inside the device obtained on a basis of a difference between the third intensity and the second intensity.

21 Claims, 9 Drawing Sheets

(56) References Cited

U.S. PATENT DOCUMENTS

2019/0140739 A1    5/2019  Liu et al.
2020/0096416 A1*   3/2020  Lönne ................ G01M 11/3154

FOREIGN PATENT DOCUMENTS

JP    2000-206004 A    7/2000
JP    2003-207413 A    7/2003

* cited by examiner

OPTICAL TRANSMISSION PATH INSPECTING SYSTEM, AND OPTICAL TRANSMISSION PATH INSPECTING DEVICE

TECHNICAL FIELD

The present disclosure relates to an optical transmission path inspecting system and an optical transmission path inspecting device. This application claims the benefit of the priority based on Japanese Patent Application No. 2019-108603, filed on Jun. 11, 2019, the entire contents disclosed in the application is incorporated herein by reference.

BACKGROUND ART

Patent Literature 1 discloses a technology related to an optical path loss measuring system. This system has an optical path switching means, a storage means, an optical path loss calculating means. The optical path switching means switches an optical path such that light from a light source is emitted to one of a measurement target optical path to which a first optical power meter is connected or a second optical power meter. The storage means stores characteristics of an optical loss of the optical path switching means in advance. The optical path loss calculating means calculates the amount of an optical loss of the measurement target optical path on a basis of the characteristics of an optical loss of the optical path switching means stored in the storage means, measurement values of the first optical power meter, and measurement values of the second optical power meter.

CITATION LIST

Patent Literature

[Patent Literature 1] Japanese Unexamined Patent Publication No. 2000-206004

SUMMARY OF INVENTION

An optical transmission path inspecting system of the present disclosure is a system for inspecting an optical transmission path constituted of a plurality of optical fibers and includes a first inspecting device configured to be provided on one end side of the optical transmission path, a second inspecting device configured to be provided on another end side of the optical transmission path, and a loss calculating unit configured to calculate a loss of each of the plurality of optical fibers. The first and second inspecting devices have a light source unit, a plurality of light input/output ports, an optical switch, a first light detecting unit, a second light detecting unit, a third light detecting unit, and an internal loss recording unit. The light source unit outputs test light. The plurality of light input/output ports each is detachably connected to each of the plurality of optical fibers. The optical switch selectively couples the light source unit with each of the light input/output ports. The first light detecting unit detects a first intensity of the test light input from the inspecting device on a counterpart side and passing through the optical switch. The second light detecting unit detects a second intensity of the test light directed from the light source unit toward the optical switch. The third light detecting unit is optically coupled to another end of a test optical fiber having one end connected to each of the plurality of light input/output ports in place of each of the plurality of optical fibers, and detects a third intensity of the test light received from the light source unit via the test optical fiber. The internal loss recording unit records a loss of an optical path inside the device obtained on a basis of a difference between the third intensity and the second intensity. The loss calculating unit calculates a loss of each of the plurality of optical fibers on a basis of a value obtained by subtracting the first intensity of the second inspecting device, a loss recorded in the internal loss recording unit of the first inspecting device, and a loss recorded in the internal loss recording unit of the second inspecting device from the second intensity of the first inspecting device.

An optical transmission path inspecting device of the present disclosure is an inspecting device capable of inspecting an optical transmission path constituted of a plurality of optical fibers and includes a light source unit, a plurality of light input/output ports, an optical switch, a first light detecting unit, a second light detecting unit, a third light detecting unit, and an internal loss recording unit. The light source unit outputs test light. The plurality of light input/output ports each allows the plurality of optical fibers to be detachably connected thereto. The optical switch selectively couples the light source unit with each of the light input/output ports. The first light detecting unit detects a first intensity of the test light input from a different inspecting device and passing through the optical switch. The second light detecting unit detects a second intensity of the test light directed from the light source unit toward the optical switch. The third light detecting unit is optically coupled to another end of a test optical fiber having one end connected to each of the plurality of light input/output ports in place of each of the plurality of optical fibers, and detects a third intensity of the test light received from the light source unit via the test optical fiber. The internal loss recording unit records a loss of an optical path inside the device obtained on a basis of a difference between the third intensity and the second intensity.

DESCRIPTION OF EMBODIMENT

Figure 1:
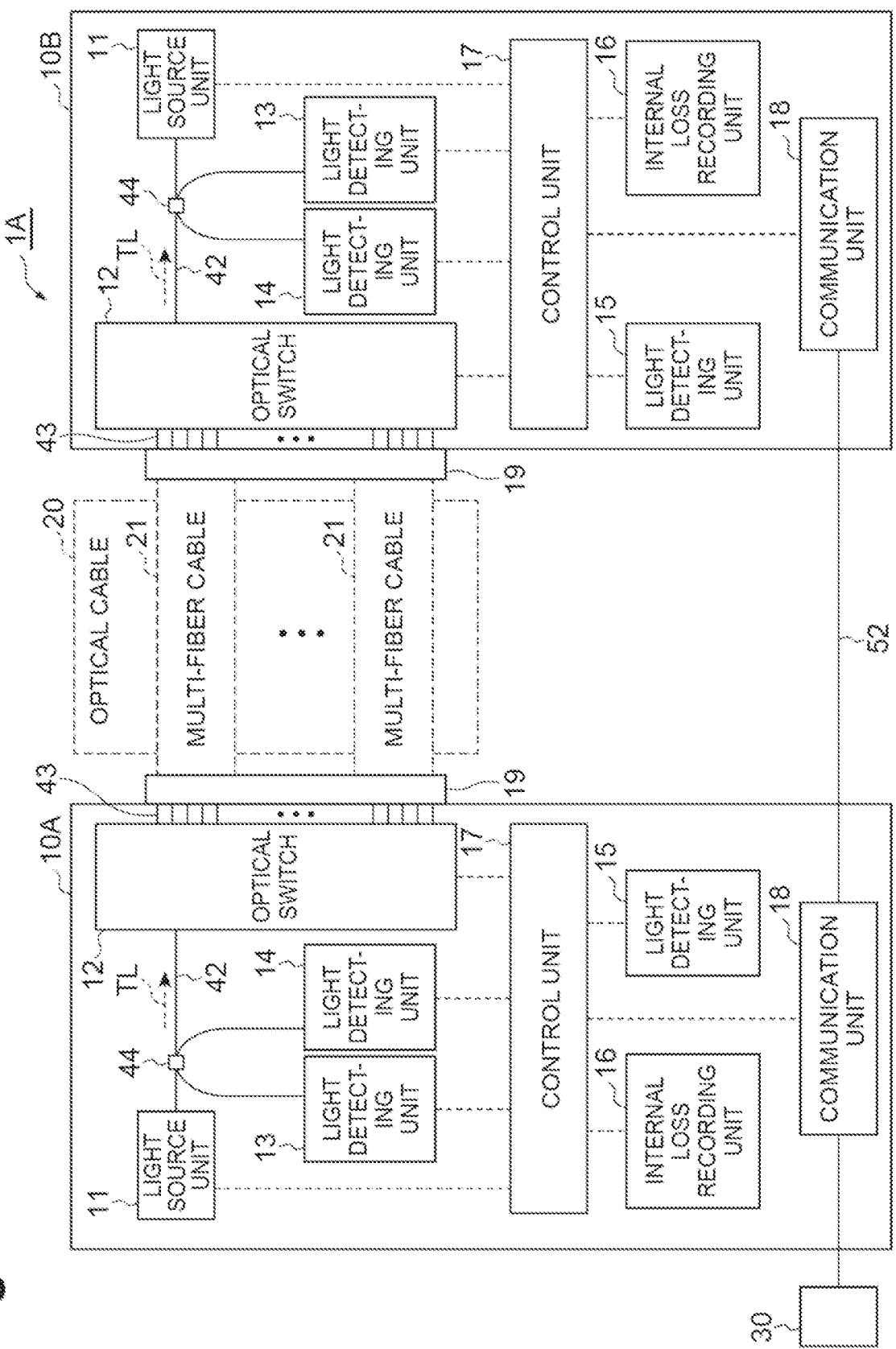
FIG. 1 is a view schematically illustrating a constitution of an inspecting system according to an embodiment.

Problem to be Solved by Present Disclosure

In the related art, when an amount of an optical loss of an optical transmission path such as an optical fiber cable in an optical transmission system is measured, in a case in which the optical transmission path includes a plurality of optical fibers, an optical switch is used for consecutively switching between optical fibers which are measurement targets. An optical switch of an inspecting device disposed on one end side of an optical transmission path causes test light output from a light source to be selectively incident on a measurement target optical fiber. In addition, another optical switch of an inspecting device disposed on another end side of the optical transmission path selects the measurement target optical fiber, causes test light to be emitted from the measurement target optical fiber, and detects an optical intensity thereof. The amount of an optical loss of the measurement target optical fiber can be measured on a basis of a difference between an intensity of the test light output from the inspecting device on one end side and the intensity of the test light detected by the inspecting device on the another end side.

However, an optical loss occurs not only in the optical fibers but also inside the inspecting devices, particularly in the optical switches. Therefore, in order to accurately measure an optical loss of optical fibers, there is a need to perform adjustment, in which an amount corresponding to an optical loss inside each of the inspecting devices disposed on both sides of an optical transmission path is subtracted in advance, that is, zero calibration. For this reason, in the related art, for example, two inspecting devices disposed on both sides of an optical transmission path are brought together at one place before measuring. Further, these inspecting devices are connected to each other using a short optical transmission path for testing, and zero calibration is performed by means of combination of these inspecting devices. However, normally, an optical transmission path which is a measurement target is long, and one end and another end thereof are far away from each other. Therefore, there is a problem that it takes time and effort to transport the inspecting devices.

Hence, an object of the present disclosure is to provide an inspecting system and an inspecting device for an optical transmission path, in which an optical loss of an optical transmission path can be accurately measured without bringing two inspecting devices disposed on both sides of the optical transmission path together at one place.

Effects of Present Disclosure

According to the present disclosure, it is possible to provide an inspecting system and an inspecting device for an optical transmission path, in which an optical loss of an optical transmission path can be accurately measured without bringing two inspecting devices disposed on both sides of an optical transmission path together at one place.

DESCRIPTION OF EMBODIMENT OF PRESENT DISCLOSURE

First, an embodiment of the present disclosure will be enumerated and described. An optical transmission path inspecting system according to the embodiment is a system for inspecting an optical transmission path constituted of a plurality of optical fibers and includes a first inspecting device configured to be provided on one end side of the optical transmission path, a second inspecting device configured to be provided on another end side of the optical transmission path, and a loss calculating unit configured to calculate a loss of each of the plurality of optical fibers. The first and second inspecting devices have a light source unit, a plurality of light input/output ports, an optical switch, a first light detecting unit, a second light detecting unit, a third light detecting unit, and an internal loss recording unit. The light source unit outputs test light. The plurality of light input/output ports each is detachably connected to each of the plurality of optical fibers. The optical switch selectively couples the light source unit with each of the light input/output ports. The first light detecting unit detects a first intensity of the test light input from the inspecting device on a counterpart side and passing through the optical switch. The second light detecting unit detects a second intensity of the test light directed from the light source unit toward the optical switch. The third light detecting unit is optically coupled to another end of a test optical fiber having one end connected to each of the plurality of light input/output ports in place of the plurality of optical fibers, and detects a third intensity of the test light received from the light source unit via the test optical fiber. The internal loss recording unit records a loss of an optical path inside the device obtained on a basis of a difference between the third intensity and the second intensity. The loss calculating unit calculates a loss of each of the plurality of optical fibers on a basis of a value obtained by subtracting the first intensity of the second inspecting device, a loss recorded in the internal loss recording unit of the first inspecting device, and a loss recorded in the internal loss recording unit of the second inspecting device from the second intensity of the first inspecting device.

An optical transmission path inspecting device according to the embodiment is an inspecting device capable of inspecting an optical transmission path constituted of a plurality of optical fibers and includes a light source unit, a plurality of light input/output ports, an optical switch, a first light detecting unit, a second light detecting unit, a third light detecting unit, and an internal loss recording unit. The light source unit outputs test light. The plurality of light input/output ports each allows the plurality of optical fibers to be detachably connected thereto. The optical switch selectively couples the light source unit with each of the light input/output ports. The first light detecting unit detects a first intensity of the test light input from a different inspecting device and passing through the optical switch. The second light detecting unit detects a second intensity of the test light directed from the light source unit toward the optical switch. The third light detecting unit is optically coupled to another end of a test optical fiber having one end connected to each of the plurality of light input/output ports in place of the plurality of optical fibers, and detects a third intensity of the test light received from the light source unit via the test optical fiber. The internal loss recording unit records a loss of an optical path inside the device obtained on a basis of a difference between the third intensity and the second intensity.

Methods for using the inspecting system and the inspecting device are as follows. First, before inspecting of an optical transmission path using the inspecting system or the inspecting device, for example, during manufacture of each inspecting device, an end of a test optical fiber is connected to each of the light input/output ports of each inspecting device. Further, test light is output from the light source unit. The test light reaches the third light detecting unit through the optical switch, each light input/output port, and the test optical fiber, and the third intensity of the test light is detected by the third light detecting unit. At the same time, the second intensity of the test light is detected by the second light detecting unit. Since the test optical fiber can be made sufficiently short compared to a plurality of optical fibers which are measurement targets, a loss of the optical path inside the device is obtained on a basis of a difference between the third intensity and the second intensity. This loss is calculated by the loss calculating unit, for example, and is recorded in the internal loss recording unit. The test optical fiber is detached from each light input/output port.

When an optical transmission path is inspected using the inspecting system or the inspecting device, the plurality of light input/output ports of the first inspecting device are connected to one ends of the plurality of optical fibers, and the plurality of light input/output ports of the second inspecting device are connected to another ends thereof. Next, test light is output from the light source unit of the first inspecting device. This test light is consecutively input to the plurality of optical fibers by the optical switch of the first inspecting device. Test light which has passed through each of the optical fibers reaches the optical switch of the second inspecting device. The optical switch of the second inspecting device selects the optical fiber which has been selected by the optical switch of the first inspecting device and inputs test light thereto. This test light reaches the first light detecting unit of the second inspecting device, and the first intensity of the test light is detected by the second light detecting unit. At the same time, the second intensity of the test light is detected by the second light detecting unit of the first inspecting device. The loss calculating unit calculates a loss of each of the plurality of optical fibers on a basis of a value obtained by subtracting the first intensity of the second inspecting device, a loss recorded in the internal loss recording unit of the first inspecting device, and a loss recorded in the internal loss recording unit of the second inspecting device from the second intensity of the first inspecting device.

According to the inspecting system and the inspecting device described above, since a loss of the optical path inside the device is recorded in the internal loss recording unit of each of the inspecting devices, an optical loss of an optical transmission path can be accurately measured without bringing two inspecting devices disposed on both sides of an optical transmission path together at one place. In addition, since each of the inspecting devices has the third light detecting unit, a loss of the optical path inside the device can be easily measured using the functions of each of the inspecting devices.

In the foregoing inspecting system, each of the first and second inspecting devices may further have a communication unit for communicating independently from the optical transmission path between the first inspecting device and the second inspecting device. Similarly, the foregoing inspecting device may further include a communication unit for communicating independently from the optical transmission path with a different inspecting device. In this case, the first intensity detected by one inspecting device, and data related to an internal loss recorded in the internal loss recording unit of one inspecting device can be easily transmitted to the other inspecting device. Therefore, the loss calculating unit installed on one end side of the optical transmission path can easily calculate a loss of each of the plurality of optical fibers. In addition, due to a communication path independent from the optical transmission path, even when a connection failure or the like exists in the optical transmission path, a loss of each of the optical fibers can be calculated, and thus an optical fiber in which a connection failure has occurred can be identified.

In the foregoing inspecting system, the communication unit of the second inspecting device may transmit the first intensity detected by the second inspecting device, and data related to a loss recorded in the internal loss recording unit of the second inspecting device to the communication unit of the first inspecting device.

In the inspecting system and the inspecting device described above, the light source unit may have two or more light sources having output wavelengths different from each other. Since the magnitude of a bending loss of the optical fibers varies depending on the wavelength, it is possible to determine whether or not a loss of the optical fibers is caused due to bending by using two or more light sources having output wavelengths different from each other.

In the inspecting system and the inspecting device described above, the optical transmission path is constituted of N (N is an integer of 2 or larger) multi-fiber cables individually including two or more optical fibers, and a number of light input/output ports included in each of the inspecting devices may be equal to or more than the total number of the optical fibers included in the N multi-fiber cables. In this case, even when different multi-fiber cables are erroneously connected, it is possible to easily ascertain the multi-fiber cable which has been erroneously connected by checking the other multi-fiber cables. That is, even when a multi-fiber cable different from a certain multi-fiber cable is erroneously connected to a light input/output unit corresponding to the certain multi-fiber cable, it is possible to easily ascertain the connected multi-fiber cable.

In the foregoing inspecting system, the loss calculating unit may be provided inside the first inspecting device or may be provided outside the first inspecting device.

DETAILS OF EMBODIMENT OF PRESENT DISCLOSURE

Specific examples of an inspecting system and an inspecting device for an optical transmission path of the present disclosure will be described below with reference to the drawings. The present invention is not limited to these examples. The present invention is indicated by the claims, and it is intended to include all changes within the meaning and the scope equivalent to the claims. In the following description, the same elements are denoted by the same reference numerals in the description of drawings, and repeated description thereof will be omitted.

FIG. 1 is a view schematically illustrating a constitution of an inspecting system according to an embodiment of the present disclosure. As illustrated in FIG. 1, this inspecting system 1A is a system for inspecting an optical transmission path 20 constituted of a plurality of optical fibers and includes an inspecting device 10A that is a first inspecting device provided on one end side of the optical transmission path 20, and an inspecting device 10B that is a second inspecting device provided on another end side of the optical transmission path 20. Since the inspecting devices 10A and 10B have the same internal constitution as each other, it is advantageous that the inspecting devices can be shared. This advantageous common internal constitution is compared to a case in which the internal constitutions thereof are different from each other. Moreover, the inspecting system 1A includes a loss calculating unit 30 calculating a loss of each of the plurality of optical fibers. For example, the optical transmission path 20 may be an optical cable constituted of N (N is an integer of 2 or larger, for example, N=10) multi-fiber cables 21 individually including two or more optical fibers.

The inspecting devices 10A and 10B have a light source unit 11, an optical switch 12, light detecting units 13, 14, and 15, an internal loss recording unit 16, a control unit 17, a communication unit 18, and a light input/output unit 19. The light source unit 11 is constituted to include a semiconductor light emitting element such as a laser diode, for example, and a circuit for driving this semiconductor light emitting element. The light source unit 11 outputs test light TL used for inspection of the optical transmission path 20. For example, the wavelength of the test light TL is a wavelength applied to an optical communication system using the optical transmission path 20. As an example, the wavelength of the test light TL is included in any of a range of 1,260 nm to 1,360 nm (O-band), a range of 1,360 nm to 1,460 nm (E-band), a range of 1,460 nm to 1,530 nm (S-band), a range of 1,530 nm to 1,565 nm (C-band), a range of 1,565 nm to 1,625 nm (L-band), and a range of 1,625 nm to 1,675 nm (U-band). The test light TL may be continuous light or, depending on a test item, may be high-frequency modulated light in which the intensity thereof varies in a cycle.

Figure 2:
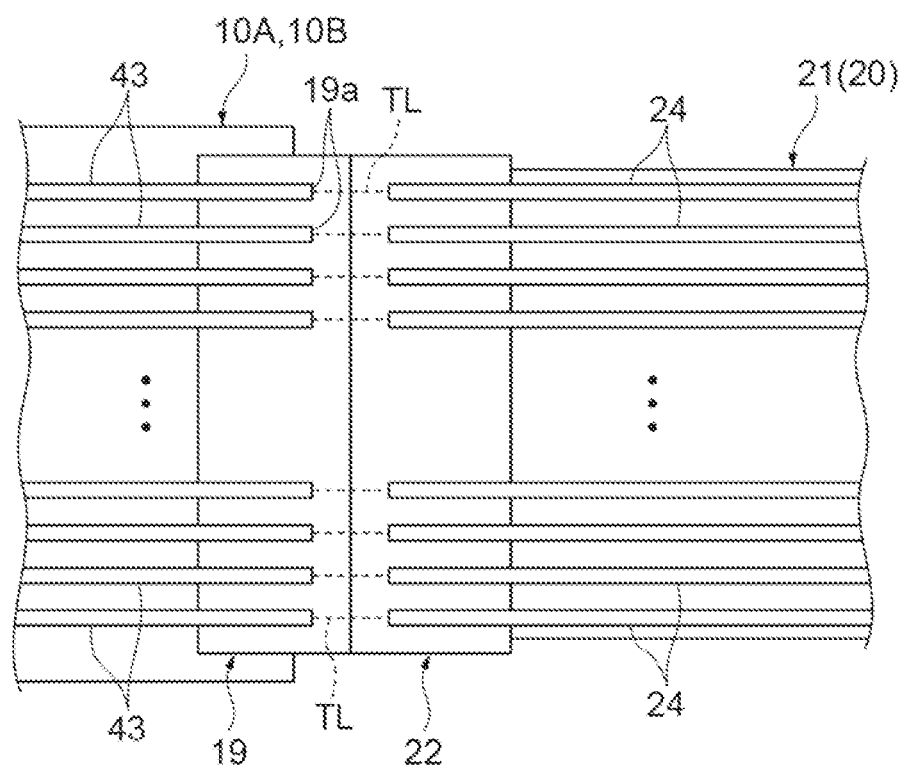
FIG. 2 is an enlarged view illustrating a light input/output unit.

FIG. 2 is an enlarged view illustrating a structure in the vicinity of the light input/output unit 19. As illustrated in FIG. 2, the light input/output unit 19 is constituted to include J (J is an integer of 2 or larger) light input/output ports 19a. The number J for light input/output ports 19a is equal to or more than the total number of optical fibers 24 included in the N multi-fiber cables 21. When each of the multi-fiber cables 21 has M (M is an integer of 2 or larger, for example, M=12) optical fibers 24, there are M×N optical fibers 24 in total. The light input/output unit 19 is an optical receptacle, for example, and is detachably connected to an optical connector 22 which is attached to end portions of the multi-fiber cables 21. Accordingly, each of the light input/output ports 19a is detachably connected to the corresponding optical fiber 24.

Refer to FIG. 1 again. The optical switch 12 is a 1×J optical switch. That is, a single optical input/output end is provided on one side of the optical switch 12, and J optical input/output ends are provided on the other side of the optical switch 12. The optical switch 12 of the inspecting device 10A functions as an optical switch for one input and J outputs, and the optical switch 12 of the inspecting device 10B functions as an optical switch for J inputs and one output. The single optical input/output end on one side is optically coupled to the light source unit 11 via an optical path 42 such as an optical fiber for example. The optical input/output ends on the other side are optically coupled to the corresponding light input/output ports 19a via optical paths 43 such as optical fibers for example, respectively. Therefore, the optical switch 12 selectively couples the light source unit 11 with each of the light input/output ports 19a. The optical switch 12 may be an optical switch adopting a method of micro-electro mechanical systems (MEMS) or may be a mechanical optical switch.

In the middle of the optical path 42, a 2×2 optical coupler 44 is provided. One of two optical input/output ends on one side of the optical coupler 44 is optically coupled to the light source unit 11, and another one is optically coupled to the light detecting unit 13. One of two optical input/output ends on the other side of the optical coupler 44 is optically coupled to the optical switch 12, and another one is optically coupled to the light detecting unit 14.

In the present embodiment, the light detecting unit 13 serves as a first light detecting unit. In the inspecting device 10B, a part of the test light TL input from the optical switch 12 branches by the optical coupler 44 and reaches the light detecting unit 13. Accordingly, the light detecting unit 13 of the inspecting device 10B detects the optical intensity of the test light TL which has been input from the inspecting device 10A on the counterpart side and has passed through the optical switch 12. In the present embodiment, this optical intensity is a first intensity. In the present embodiment, the light detecting unit 14 serves as a second light detecting unit.

In the inspecting device 10A, a part of the test light TL output from the light source unit 11 branches by the optical coupler 44 and reaches the light detecting unit 14. Accordingly, the light detecting unit 14 of the inspecting device 10A detects the optical intensity of the test light TL directed from the light source unit 11 toward the optical switch 12. In the present embodiment, this optical intensity is a second intensity. The light detecting units 13 and 14 are constituted to include a semiconductor light receiving element such as a photodiode for example and a circuit which converts a photocurrent output from the semiconductor light receiving element into a voltage signal.

Figure 3:
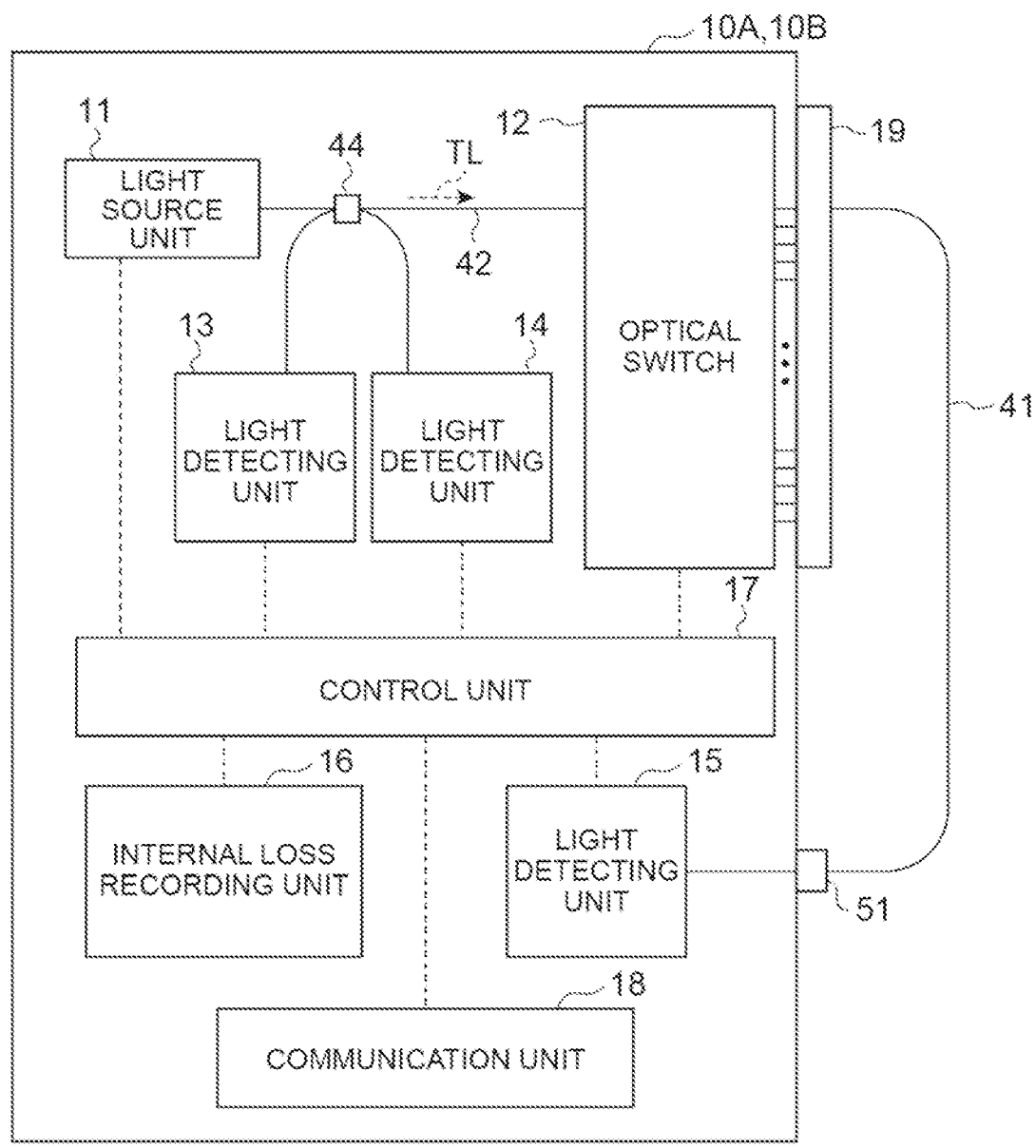
FIG. 3 is a view illustrating a connection form of the inspecting device in a stage prior to inspection.

Here, constituent elements used in a stage before inspecting the optical transmission path 20 will be described. FIG. 3 is a view illustrating a connection form of the inspecting devices 10A and 10B in a stage prior to inspection. As illustrated in FIG. 3, the optical transmission path 20 is detached from the light input/output unit 19 in a stage prior to inspection, and one end of a test optical fiber 41 is connected to the light input/output unit 19. The test optical fiber 41 may be a single optical fiber or may be an optical cable including a plurality of optical fibers. Another end of the test optical fiber 41 is connected to a light input/output port 51. The light input/output port 51 and the test optical fiber 41 may be able to be attached to and detached from each other or may be semi-permanently fixed to each other.

In the present embodiment, the light detecting unit 15 serves as a third light detecting unit. The light detecting unit 15 is optically coupled to the another end of the test optical fiber 41 via the light input/output port 51. The light detecting unit 15 detects the optical intensity of the test light TL received from the light source unit 11 via the test optical fiber 41. In the present embodiment, this optical intensity is a third intensity. Similar to the light detecting units 13 and 14, the light detecting unit 15 is also constituted to include a semiconductor light receiving element such as a photodiode for example and a circuit which converts a photocurrent output from this semiconductor light receiving element into a voltage signal.

The internal loss recording unit 16 is a portion recording data related to a loss of the optical path inside the inspecting device 10A or 10B including the internal loss recording unit 16. The internal loss recording unit 16 can be constituted of a nonvolatile storage device such as a ROM or a hard disk for example. A loss of the optical path inside the device is calculated on the basis of the difference between the optical intensity (third intensity) of the test light TL which is detected by the light detecting unit 15 and the optical intensity (second intensity) of the test light TL which is detected by the light detecting unit 14 and directed from the light source unit 11 toward the optical switch 12. This calculation may be performed by the control unit 17 or may be performed by the loss calculating unit 30.

The communication unit 18 is a portion for communicating independently from the optical transmission path 20 between the inspecting device 10A and the inspecting device 10B. The communication unit 18 is constituted to include a media converter for example. The communication unit 18 converts an electrical signal into an optical signal, transmits the converted optical signal to the inspecting device on the counterpart side, and converts an optical signal received from the inspecting device on the counterpart side into an electrical signal. For this reason, the inspecting devices 10A and 10B may be connected to each other through an optical transmission path 52 other than the optical transmission path 20. The optical transmission path 52 is a single-fiber optical cable for example. The communication unit 18 is connected to the loss calculating unit 30 by cable or radio. The communication unit 18 transmits data related to the optical intensity detected by the light detecting units 13, 14, and 15 to the loss calculating unit 30. Moreover, the communication unit 18 is used for operating the optical switch 12 of the inspecting device 10A and the optical switch 12 of the inspecting device 10B in association with each other. The communication unit 18 is not limited to a media converter. For example, it may be an electrical communication means such as a LAN.

The control unit 17 can be constituted of a computer having a CPU, a RAM, and a ROM mounted on a wiring board, for example. The control unit 17 is electrically connected to the light source unit 11 and the optical switch 12 and controls operation of these. The control unit 17 is electrically connected to the light detecting units 13, 14, and 15 and the communication unit 18. The control unit 17 provides the communication unit 18 with data related to the optical intensity detected by the light detecting units 13, 14, and 15. The control unit 17 is electrically connected to the internal loss recording unit 16 and causes the internal loss recording unit 16 to record data related to a loss of the optical path inside the device computed by itself or received from the loss calculating unit 30 through the communication unit 18.

The loss calculating unit 30 may be provided inside the inspecting device 10A as a part of the inspecting device 10A or may be provided outside the inspecting device 10A separately from the inspecting device 10A. FIG. 1 illustrates a case in which the loss calculating unit 30 is provided outside the inspecting device 10A. In this case, the loss calculating unit 30 is connected to the inspecting device 10A by cable or radio and communicates with the communication unit 18 of the inspecting device 10A. The loss calculating unit 30 calculates a loss of each of the plurality of optical fibers 24 included in the optical transmission path 20. Specifically, the loss calculating unit 30 calculates a loss of each of the plurality of optical fibers 24 on the basis of the following mathematical expression.

$$[\text{Loss of optical fiber}] = Pa - Pb - La - Lb \quad (1)$$

In the above mathematical expression (1), Pa is the optical intensity (second intensity) of the test light TL directed from the light source unit 11 toward the optical switch 12 in the inspecting device 10A. Pa is detected by the light detecting unit 14 of the inspecting device 10A. Pb is the optical intensity (first intensity) of the test light TL input from the optical switch 12 of the inspecting device 10B. Pb is detected by the light detecting unit 13 of the inspecting device 10B in a state in which the optical transmission path 20 is connected to the inspecting devices 10A and 10B. La is a loss of the optical path inside the inspecting device 10A. La is detected by the light detecting unit 15 of the inspecting device 10A in a state in which the test optical fiber 41 connects each light input/output port 19a of the inspecting device 10A with the light input/output port 51. La is recorded in the internal loss recording unit 16 of the inspecting device 10A. Lb is a loss of the optical path inside the inspecting device 10B. Lb is detected by the light detecting unit 15 of the inspecting device 10B in a state in which the test optical fiber 41 connects each light input/output port 19a of the inspecting device 10B with the light input/output port 51. Lb is recorded in the internal loss recording unit 16 of the inspecting device 10B. In this manner, the loss calculating unit 30 in the present embodiment calculates a loss of each of the plurality of optical fibers 24 on the basis of a value obtained by subtracting Pb, La, and Lb from Pa.

Figure 4:
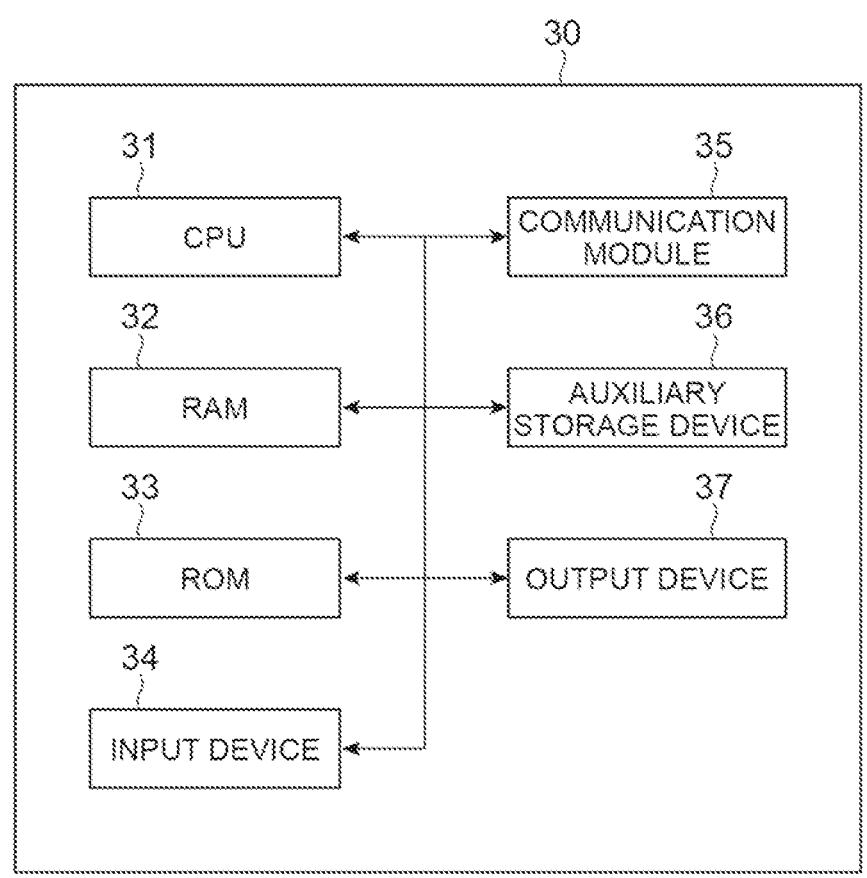
FIG. 4 is a block diagram illustrating an example of a hardware constitution of a loss calculating unit.

FIG. 4 is a block diagram illustrating an example of a hardware constitution of the loss calculating unit 30. As illustrated in FIG. 4, the loss calculating unit 30 is constituted to include a computer including hardware such as a CPU 31, a RAM 32, a ROM 33, an input device 34, a communication module 35, an auxiliary storage device 36, and an output device 37. The loss calculating unit 30 realizes the functions described above when these constituent elements are operated by a program or the like.

Here, a using method and operation of the inspecting system 1A will be described. First, before inspecting of the optical transmission path 20 using this inspecting system 1A, for example, during manufacture of the inspecting devices 10A and 10B, an end of the test optical fiber 41 is connected to each of the light input/output ports 19a of each of the inspecting devices 10A and 10B. Further, the test light TL is output from the light source unit 11. The test light TL reaches the light detecting unit 15 through the optical switch 12, each light input/output port 19a, and the test optical fiber 41, and the optical intensity of the test light TL is detected by the light detecting unit 15. At the same time, the optical intensity of the test light TL is detected by the light detecting unit 14. Since the test optical fiber 41 can be made sufficiently short compared to the optical transmission path 20 which is a measurement target, the losses La and Lb of the optical path inside the device can be obtained on the basis of a difference between the optical intensities thereof. The losses La and Lb are calculated by the loss calculating unit 30 or the control unit 17 for example, and are recorded in the internal loss recording unit 16. Thereafter, the test optical fiber 41 is detached from each light input/output port 19a.

When the optical transmission path 20 is inspected using the inspecting system 1A, a plurality of light input/output ports 19a of the inspecting device 10A are connected to one ends of the plurality of optical fibers 24 constituting the optical transmission path 20, and a plurality of light input/output ports 19a of the inspecting device 10B are connected to another ends thereof. Next, the test light TL is output from the light source unit 11 of the inspecting device 10A. This test light TL is input to one optical fiber 24 via the optical switch 12 of the inspecting device 10A. The test light TL which has passed through this optical fiber 24 reaches the optical switch 12 of the inspecting device 10B. The optical switch 12 of the inspecting device 10B selects the optical fiber 24 which has been selected by the optical switch 12 of the inspecting device 10A and emits the test light TL from the optical fiber 24. This test light TL reaches the light detecting unit 13 of the inspecting device 10B, and the optical intensity Pb of this test light TL is detected by the light detecting unit 13. At the same time, the optical intensity Pa of the test light TL is detected by the light detecting unit 14 of the inspecting device 10A. Thereafter, the optical switch 12 of the inspecting devices 10A and 10B selects another optical fiber 24, and similar operation is performed. Thereafter, similar operation is performed for all of the plurality of optical fibers 24 constituting the optical transmission path 20. The loss calculating unit 30 calculates a loss of each of the plurality of optical fibers 24 on the basis of the foregoing mathematical expression (1).

Figure 9:
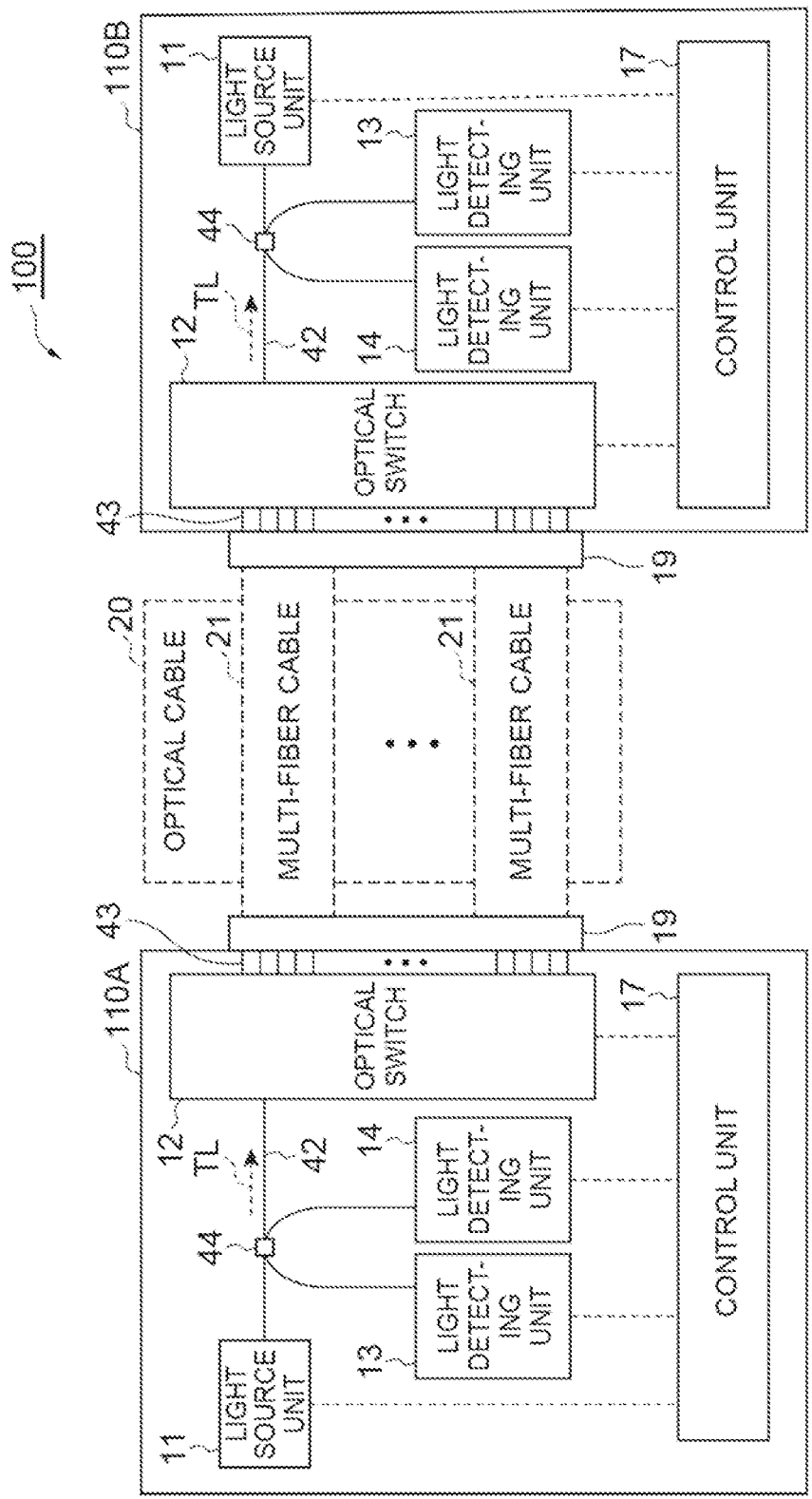
FIG. 9 is a view schematically illustrating a constitution of an inspecting system as a comparative example.

Effects achieved by the inspecting system 1A and the inspecting devices 10A and 10B described above will be described. FIG. 9 is a view schematically illustrating a constitution of an inspecting system 100 as a comparative example. As illustrated in FIG. 9, this inspecting system 100 is a system for inspecting the optical transmission path 20 and includes an inspecting device 110A provided on one end side of the optical transmission path 20 and an inspecting device 110B provided on another end side of the optical transmission path 20. Moreover, the inspecting system 100 includes a loss calculating unit (not illustrated) calculating a loss of each of the plurality of optical fibers 24. Each of the inspecting devices 110A and 110B has the light source unit 11, the optical switch 12, the light detecting units 13 and 14, the control unit 17, and the light input/output unit 19. Details of these elements are similar to those of the inspecting devices 10A and 10B in the present embodiment.

The loss calculating unit of this inspecting system 100 calculates a loss of each of the plurality of optical fibers 24 on the basis of the following mathematical expression.

$$[\text{Loss of optical fiber}] = Pa - Pb \qquad (2)$$

Pa is the optical intensity of the test light TL directed from the light source unit 11 of the inspecting device 110A toward the optical switch 12 and is detected by the light detecting unit 14 of the inspecting device 110A. Pb is the optical intensity of the test light TL input from the optical switch 12 of the inspecting device 110B and is detected by the light detecting unit 13 of the inspecting device 110B.

However, an optical loss occurs not only in the optical fibers 24 but also inside the inspecting devices 110A and 110B, particularly in the optical switches 12. Therefore, in order to accurately measure an optical loss of the optical fibers 24, there is a need to perform adjustment, in which an amount corresponding to an optical loss inside each of the inspecting devices 110A and 110B disposed on both sides of the optical transmission path 20 is subtracted in advance, that is, zero calibration. For this reason, in the related art, for example, two inspecting devices 110A and 110B disposed on both sides of the optical transmission path 20 are brought together at one place before measuring. Further, these inspecting devices 110A and 110B are connected to each other using a short optical transmission path for testing, and zero calibration is performed by means of combination of these inspecting devices 110A and 110B. However, normally, the optical transmission path 20 which is a measurement target is long, and one end and another end thereof are far away from each other. Therefore, there is a problem that it takes time and effort to transport the inspecting devices 110A and 110B. In addition, there is also a problem that combination of the inspecting devices 110A and 110B is limited to combination which has been subjected to zero calibration and a different inspecting device cannot be used.

Regarding these problems, according to the inspecting system 1A in the present embodiment, since a loss of the optical path inside the device is recorded in the internal loss recording unit 16 of each of the inspecting devices 10A and 10B, even if two inspecting devices 10A and 10B disposed on both sides of the optical transmission path 20 are not brought together at one place, an optical loss of the optical transmission path 20 can be accurately measured. In addition, since each of the inspecting devices 10A and 10B has the light detecting unit 15, a loss of the optical path inside the device can be easily measured using the functions of each of the inspecting devices 10A and 10B. Moreover, since each of the inspecting devices retains a loss of itself, combination of the inspecting devices is not limited, and thus convenience can be improved. For example, when an inspecting device breaks down, it can be replaced with another inspecting device. In addition, it is possible to save the labor of managing combinations of the inspecting devices.

Figure 5:
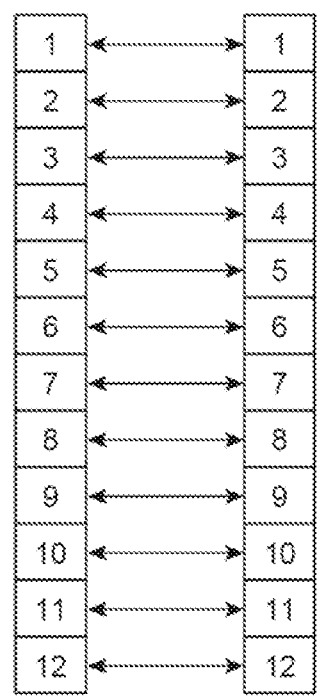
FIG. 5 is a view illustrating an example of a polarity of a multi-fiber cable with connectors.
Figure 6:
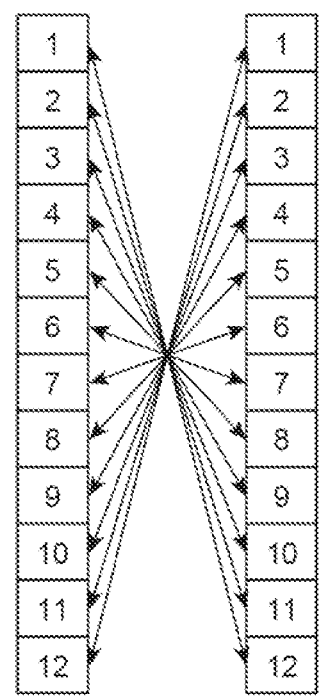
FIG. 6 is a view illustrating another example of a polarity of a multi-fiber cable with connectors.
Figure 7:
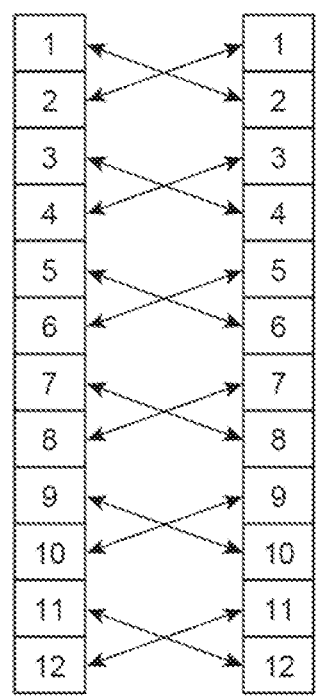
FIG. 7 is a view illustrating another example of a polarity of a multi-fiber cable with connectors.

In addition, generally, polarities are present in the multi-fiber cables 21 with connectors. FIGS. 5, 6, and 7 respectively illustrate examples of polarities of the multi-fiber cables 21 with connectors. In these diagrams, the numbers 1 to 12 are assigned to twelve terminals of optical connectors attached to both ends of the multi-fiber cable 21. FIG. 5 illustrates a polarity of Type-A (straight) of TIA568.3. FIG. 6 illustrates a polarity of Type-B (reversed) of TIA568.3. FIG. 7 illustrates a polarity of Type-C (pairs flipped) of TIA568.3. In the case of the inspecting system 100 according to the comparative example described above, the polarity of a multi-fiber cable for testing are selected in accordance with the polarity of the multi-fiber cable 21 with connectors which is inspection targets, and zero calibration is performed. Thus, there is a problem that the multi-fiber cable 21 having a different polarity cannot be inspected and this lacks versatility. In contrast, in the present embodiment, the internal losses La and Lb are independently recorded for each of the optical fibers 24 in the respective inspecting devices 10A and 10B. Therefore, while arbitrary inspecting devices are combined as the inspecting devices 10A and 10B, the multi-fiber cables 21 having various polarities can be easily inspected by selecting combination of the internal losses La and Lb in accordance with the polarities of the multi-fiber cables 21.

As in the present embodiment, the inspecting devices 10A and 10B may further have the communication unit 18 for communicating independently from the optical transmission path 20 between the inspecting device 10A and the inspecting device 10B. Accordingly, information related to the optical intensity Pb detected by the light detecting unit 13 of the inspecting device 10B and data related to the internal loss Lb recorded in the internal loss recording unit 16 of the inspecting device 10B can be easily transmitted to the inspecting device 10A. Therefore, the loss calculating unit 30 installed on one end side of the optical transmission path 20 can easily calculate a loss of each of the plurality of optical fibers 24. In addition, since a communication path is independent from the optical transmission path 20, when a connection failure or the like exists in the optical transmission path 20, or when combination of the optical fibers 24 to be connected is incorrect due to erroneous determination of the polarity, for example, even when a place to be treated with the type A is treated with the type B or the like, a loss of other optical fibers 24 can be calculated and the optical fiber 24 in which a connection failure has occurred can also be identified. Moreover, the control unit 17 controls the optical switch 12 and searches for a path through which light passes so that it is possible to easily determine which optical fibers 24 are connected in combination, and thus analysis of a connection error can be easily performed.

As in the present embodiment, the optical transmission path 20 is constituted of the N multi-fiber cables 21 individually including two or more optical fibers 24, and the number of light input/output ports 19a included in each of the inspecting devices 10A and 10B may be equal to or more than the total number of the optical fibers 24 included in the N multi-fiber cables 21. In this case, even when different multi-fiber cables 21 are erroneously connected, it is possible to easily ascertain the multi-fiber cable 21 which has been erroneously connected by checking other multi-fiber cables. That is, even when a multi-fiber cable 21 different from a certain multi-fiber cable 21 is erroneously connected to the light input/output unit 19 corresponding to the certain multi-fiber cable 21, it is possible to easily ascertain the connected multi-fiber cable 21.

In this case, connection pattern information indicating how each of the ports of the optical switch 12 in the inspecting devices 10A and 10B and each of the multi-fiber cable 21 are connected to each other (for example, correspondence information between port numbers and fiber numbers) and grouping information of the multi-fiber cables 21 are recorded and retained. Further, estimated values of an optical loss of each of the multi-fiber cables 21 in each of the connection patterns are compared to measurement results. Therefore, for example, even when the multi-fiber cable 21 is erroneously input and connected to a light input/output unit 19 corresponding a different multi-fiber cable 21, it is possible to detect such an erroneous circumstance. The foregoing "estimated values" and "measurement results" include not only specific loss values but also the presence or absence of light passing therethrough.

Moreover, these pieces of information are retained for each of the patterns to be connected so that even when the polarities of at least two multi-fiber cables 21 differ from each other or when the numbers of fibers of at least two multi-fiber cables 21 differ from each other, abnormal connection or erroneous connection can be easily detected.

MODIFICATION EXAMPLE

Figure 8:
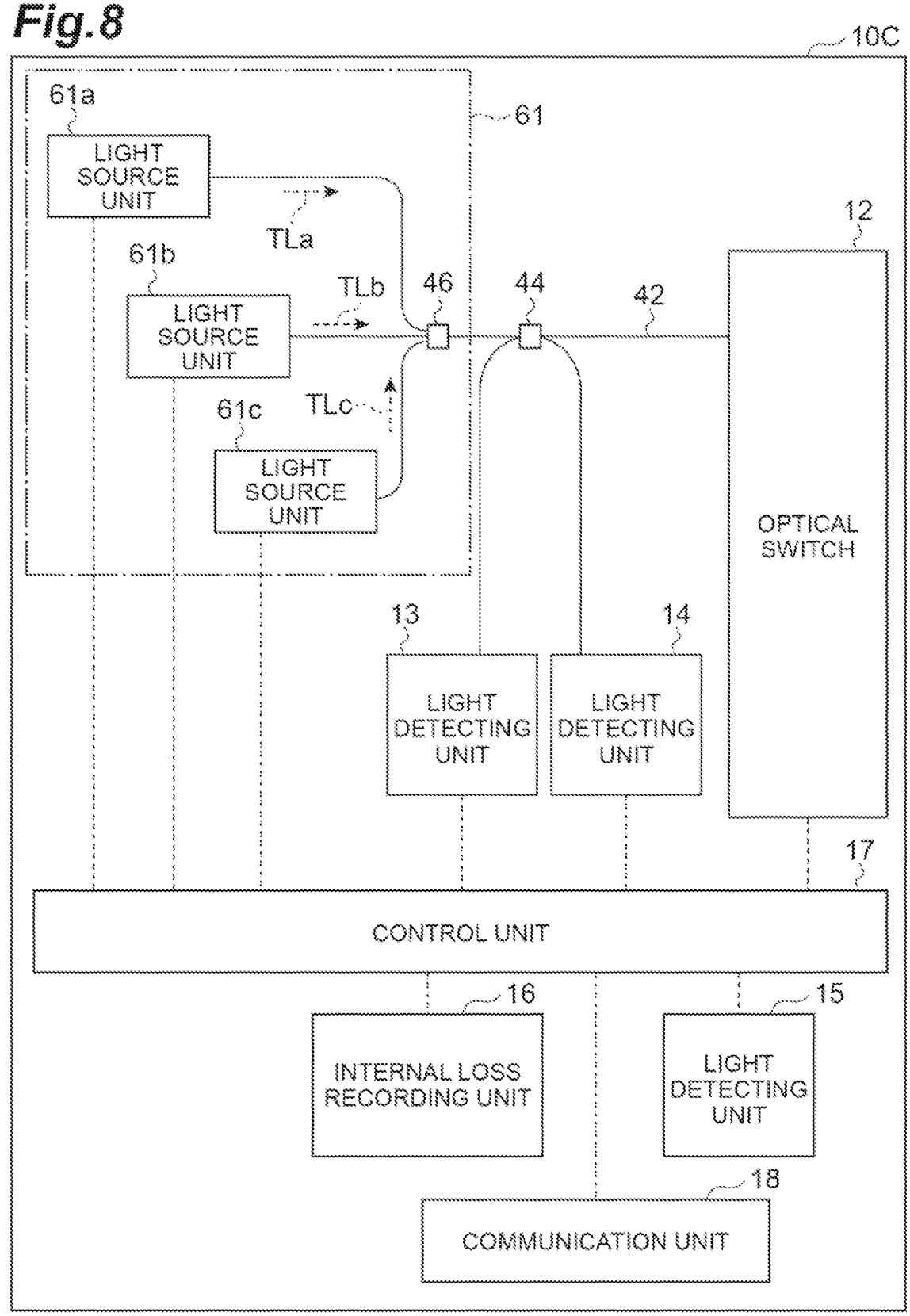
FIG. 8 is a view schematically illustrating a constitution of an inspecting device according to a modification example.

FIG. 8 is a view schematically illustrating a constitution of an inspecting device 10C according to a modification example of the foregoing embodiment. The inspecting device 10C has a light source unit 61 in place of the light source unit 11 of the foregoing embodiment. The light source unit 61 has two or more (three in the illustrated example) light sources 61a, 61b, and 61c having output wavelengths different from each other. The light sources 61a, 61b, and 61c are coupled to the optical path 42 via an optical coupler 46 for three inputs and one output. In addition, the light sources 61a, 61b, and 61c are electrically connected to the control unit 17 and consecutively output test light TLa, test light TLb, and test light TLc in accordance with an instruction from the control unit 17.

As in the present modification example, the light source unit 61 may have two or more light sources 61a, 61b, and 61c having output wavelengths different from each other. For example, in a single mode optical fiber of ITU-T G.625, in a case in which the bending radius is 15 mm, the bending loss is approximately $2.33 \times 10^{-2}$ dB/m when the wavelength is 1.31 μm, the bending loss is approximately 1.45 dB/m when the wavelength is 1.55 μm, and the bending loss is approximately 4.77 dB/m when the wavelength is 1.65 μm. In this manner, since the magnitude of a bending loss of the optical fibers 24 varies depending on the wavelength, the bending radius can be inferred from the difference between losses in the wavelengths. Thus, it is possible to determine whether or not a loss of the optical fibers 24 is caused due to bending by using two or more light sources 61a, 61b, and 61c having output wavelengths different from each other.

The optical transmission path inspecting system according to the present invention is not limited to the embodiment described above, and various other modifications can be performed. For example, in the foregoing embodiment, the optical transmission path 20 constituted of a plurality of multi-fiber cables 21 has been described as an example of an inspection target. The optical transmission path 20 may be constituted of a single multi-fiber ribbon or a plurality of multi-fiber ribbons, or a plurality of single optical fibers 24 may constitute the multi-fiber cable 21. Alternatively, these may be combined and constitute the multi-fiber cable 21. In addition, in the foregoing embodiment, an example of a case in which each of the inspecting devices 10A and 10B has the communication unit 18 has been described. However, the communication unit 18 can also be made unnecessary when information related to the optical intensity detected by the light detecting unit 13 of the inspecting device 10B and data recorded in the internal loss recording unit 16 can be provided to the loss calculating unit 30 by a different means, for example, optical communication using the optical fibers 24.

REFERENCE SIGNS LIST

1A Inspecting system
10A, 10B, 10C Inspecting device
11 Light source unit
12 Optical switch
13, 14, 15 Light detecting unit
16 Internal loss recording unit
17 Control unit
18 Communication unit
19 Light input/output unit
19a Light input/output port
20 Optical transmission path
21 multi-fiber cable
22 Optical connector
24 Optical fiber
30 Loss calculating unit
34 Input device
35 Communication module
36 Auxiliary storage device
37 Output device
41 Test optical fibers
42, 43 Optical path
44, 46 Optical coupler
51 Light input/output port
61 Light source unit
61a, 61b, 61c Light source
TL, TLa, TLb, TLc Test light

The invention claimed is:

1. A system for inspecting an optical transmission path constituted of a plurality of optical fibers, comprising:
   a first inspecting device configured to be provided on one end side of the optical transmission path;
   a second inspecting device configured to be provided on another end side of the optical transmission path; and
   a loss calculating unit configured to calculate a loss of each of the plurality of optical fibers,
   wherein each of the first and second inspecting devices has
   a light source unit outputting test light,
   a plurality of light input/output ports each detachably connected to each of the plurality of optical fibers,
   an optical switch selectively coupling the light source unit with each of the light input/output ports,
   a first light detecting unit detecting a first intensity of the test light input from the first or second inspecting device on a counterpart side and passing through the optical switch,
   a second light detecting unit detecting a second intensity of the test light directed from the light source unit toward the optical switch,
   a third light detecting unit optically coupled to another end of a test optical fiber having one end connected to each of the plurality of light input/output ports in place of each of the plurality of optical fibers, and detecting a third intensity of the test light received from the light source unit via the test optical fiber, and an internal loss recording unit recording a loss of an optical path inside the device obtained on a basis of a difference between the third intensity and the second intensity, wherein the loss calculating unit calculates a loss of each of the plurality of optical fibers on a basis of a value obtained by subtracting the first intensity of the second inspecting device, a loss recorded in the internal loss recording unit of the first inspecting device, and a loss recorded in the internal loss recording unit of the second inspecting device from the second intensity of the first inspecting device, and wherein each of the first and second inspecting devices further has a communication unit for communicating independently from the optical transmission path between the first inspecting device and the second inspecting device.

2. The system for inspecting the optical transmission path according to claim 1, wherein the communication unit of the second inspecting device transmits the first intensity detected in the second inspecting device and data related to a loss recorded in the internal loss recording unit of the second inspecting device to the communication unit of the first inspecting device.

3. The system for inspecting the optical transmission path according to claim 2, wherein the light source unit has two or more light sources having output wavelengths different from each other.

4. The system for inspecting the optical transmission path according to claim 2, wherein the optical transmission path is constituted of N (N is an integer of 2 or larger) multi-fiber cables individually including two or more of the optical fibers, and wherein a number of the light input/output ports included in the first and second inspecting devices is equal to or more than a total number of the optical fibers included in the N multi-fiber cables.

5. The system for inspecting the optical transmission path according to claim 1, wherein the light source unit has two or more light sources having output wavelengths different from each other.

6. The system for inspecting the optical transmission path according to claim 5, wherein the optical transmission path is constituted of N (N is an integer of 2 or larger) multi-fiber cables individually including two or more of the optical fibers, and wherein a number of the light input/output ports included in the first and second inspecting devices is equal to or more than a total number of the optical fibers included in the N multi-fiber cables.

7. The system for inspecting the optical transmission path according to claim 1, wherein the optical transmission path is constituted of N (N is an integer of 2 or larger) multi-fiber cables individually including two or more of the optical fibers, and wherein a number of the light input/output ports included in the first and second inspecting devices is equal to or more than a total number of the optical fibers included in the N multi-fiber cables.

8. The system for inspecting the optical transmission path according to claim 1, wherein the loss calculating unit is provided inside the first inspecting device.

9. The system for inspecting the optical transmission path according to claim 1, wherein the loss calculating unit is provided outside the first inspecting device.

10. An inspecting device configured to inspect an optical transmission path constituted of a plurality of optical fibers, comprising:

a light source unit configured to output test light;

a plurality of light input/output ports each configured to allow each of the plurality of optical fibers to be detachably connected thereto;

an optical switch configured to selectively couple the light source unit with each of the light input/output ports;

a first light detecting unit configured to detect a first intensity of the test light input from a different inspecting device and passing through the optical switch;

a second light detecting unit configured to detect a second intensity of the test light directed from the light source unit toward the optical switch;

a third light detecting unit configured to be optically coupled to another end of a test optical fiber having one end connected to each of the plurality of light input/output ports in place of each of the plurality of optical fibers, and to detect a third intensity of the test light received from the light source unit via the test optical fiber;

an internal loss recording unit configured to record a loss of an optical path inside the device obtained on a basis of a difference between the third intensity and the second intensity; and a communication unit configured to perform communication with the different inspecting device independently from the optical transmission path.

11. The inspecting device for inspecting the optical transmission path according to claim 10, wherein the light source unit has two or more light sources having output wavelengths different from each other.

12. The inspecting device for inspecting the optical transmission path according to claim 11, wherein the optical transmission path is constituted of N (N is an integer of 2 or larger) multi-fiber cables individually including two or more of the optical fibers, and wherein a number of the light input/output ports is equal to or more than a total number of the optical fibers included in the N multi-fiber cables.

13. The inspecting device for inspecting the optical transmission path according to claim 10, wherein the optical transmission path is constituted of N (N is an integer of 2 or larger) multi-fiber cables individually including two or more of the optical fibers, and wherein a number of the light input/output ports is equal to or more than a total number of the optical fibers included in the N multi-fiber cables.

14. A system for inspecting an optical transmission path constituted of a plurality of optical fibers, comprising:

a first inspecting device configured to be provided on one end side of the optical transmission path;

a second inspecting device configured to be provided on another end side of the optical transmission path; and a loss calculating unit configured to calculate a loss of each of the plurality of optical fibers, wherein each of the first and second inspecting devices has a light source unit outputting test light, a plurality of light input/output ports each detachably connected to each of the plurality of optical fibers, an optical switch selectively coupling the light source unit with each of the light input/output ports, a first light detecting unit detecting a first intensity of the test light input from the first or second inspecting device on a counterpart side and passing through the optical switch, a second light detecting unit detecting a second intensity of the test light directed from the light source unit toward the optical switch, a third light detecting unit optically coupled to another end of a test optical fiber having one end connected to each of the plurality of light input/output ports in place of each of the plurality of optical fibers, and detecting a third intensity of the test light received from the light source unit via the test optical fiber, and an internal loss recording unit recording a loss of an optical path inside the device obtained on a basis of a difference between the third intensity and the second intensity, wherein the loss calculating unit calculates a loss of each of the plurality of optical fibers on a basis of a value obtained by subtracting the first intensity of the second inspecting device, a loss recorded in the internal loss recording unit of the first inspecting device, and a loss recorded in the internal loss recording unit of the second inspecting device from the second intensity of the first inspecting device, wherein the optical transmission path is constituted of N (N is an integer of 2 or larger) multi-fiber cables individually including two or more of the optical fibers, and wherein a number of the light input/output ports included in the first and second inspecting devices is equal to or more than a total number of the optical fibers included in the N multi-fiber cables.

15. The system for inspecting the optical transmission path according to claim 14,
wherein the light source unit has two or more light sources having output wavelengths different from each other.

16. The system for inspecting the optical transmission path according to claim 14,
wherein the loss calculating unit is provided inside the first inspecting device.

17. The system for inspecting the optical transmission path according to claim 14,
wherein the loss calculating unit is provided outside the first inspecting device.

18. An inspecting device configured to inspect an optical transmission path constituted of a plurality of optical fibers, comprising:
a light source unit configured to output test light;
a plurality of light input/output ports each configured to allow each of the plurality of optical fibers to be detachably connected thereto;
an optical switch configured to selectively couple the light source unit with each of the light input/output ports;
a first light detecting unit configured to detect a first intensity of the test light input from a different inspecting device and passing through the optical switch;
a second light detecting unit configured to detect a second intensity of the test light directed from the light source unit toward the optical switch;

a third light detecting unit configured to be optically coupled to another end of a test optical fiber having one end connected to each of the plurality of light input/output ports in place of each of the plurality of optical fibers, and to detect a third intensity of the test light received from the light source unit via the test optical fiber; and an internal loss recording unit configured to record a loss of an optical path inside the device obtained on a basis of a difference between the third intensity and the second intensity, wherein the optical transmission path is constituted of N (N is an integer of 2 or larger) multi-fiber cables individually including two or more of the optical fibers, and wherein a number of the light input/output ports is equal to or more than a total number of the optical fibers included in the N multi-fiber cables.

19. The inspecting device for inspecting the optical transmission path according to claim 18,
wherein the light source unit has two or more light sources having output wavelengths different from each other.

20. A system for inspecting an optical transmission path constituted of a plurality of optical fibers, comprising:
a first inspecting device configured to be provided on one end side of the optical transmission path;
a second inspecting device configured to be provided on another end side of the optical transmission path; and
a loss calculating unit configured to calculate a loss of each of the plurality of optical fibers, wherein each of the first and second inspecting devices has
a light source unit outputting test light,
a plurality of light input/output ports each detachably connected to each of the plurality of optical fibers,
an optical switch selectively coupling the light source unit with each of the light input/output ports,
a first light detecting unit detecting a first intensity of the test light input from the first or second inspecting device on a counterpart side and passing through the optical switch,
a second light detecting unit detecting a second intensity of the test light directed from the light source unit toward the optical switch,
a third light detecting unit optically coupled to another end of a test optical fiber having one end connected to each of the plurality of light input/output ports in place of each of the plurality of optical fibers, and detecting a third intensity of the test light received from the light source unit via the test optical fiber, and
an internal loss recording unit recording a loss of an optical path inside the device obtained on a basis of a difference between the third intensity and the second intensity, wherein the loss calculating unit calculates a loss of each of the plurality of optical fibers on a basis of a value obtained by subtracting the first intensity of the second inspecting device, a loss recorded in the internal loss recording unit of the first inspecting device, and a loss recorded in the internal loss recording unit of the second inspecting device from the second intensity of the first inspecting device, wherein the light source unit has two or more light sources having output wavelengths different from each other, wherein the optical transmission path is constituted of N (N is an integer of 2 or larger) multi-fiber cables individually including two or more of the optical fibers, and wherein a number of the light input/output ports included in the first and second inspecting devices is equal to or more than a total number of the optical fibers included in the N multi-fiber cables.

21. An inspecting device configured to inspect an optical transmission path constituted of a plurality of optical fibers, comprising:

a light source unit configured to output test light;

a plurality of light input/output ports each configured to allow each of the plurality of optical fibers to be detachably connected thereto;

an optical switch configured to selectively couple the light source unit with each of the light input/output ports;

a first light detecting unit configured to detect a first intensity of the test light input from a different inspecting device and passing through the optical switch;

a second light detecting unit configured to detect a second intensity of the test light directed from the light source unit toward the optical switch;

a third light detecting unit configured to be optically coupled to another end of a test optical fiber having one end connected to each of the plurality of light input/output ports in place of each of the plurality of optical fibers, and to detect a third intensity of the test light received from the light source unit via the test optical fiber; and an internal loss recording unit configured to record a loss of an optical path inside the device obtained on a basis of a difference between the third intensity and the second intensity, wherein the light source unit has two or more light sources having output wavelengths different from each other, wherein the optical transmission path is constituted of N (N is an integer of 2 or larger) multi-fiber cables individually including two or more of the optical fibers, and wherein a number of the light input/output ports is equal to or more than a total number of the optical fibers included in the N multi-fiber cables.

* * * * *